(12) United States Patent
Zhang et al.

(10) Patent No.: US 11,910,321 B2
(45) Date of Patent: Feb. 20, 2024

(54) REPETITIVE DATA TRANSMISSION METHOD AND APPARATUS

(71) Applicant: Huawei Technologies Co., Ltd., Shenzhen (CN)

(72) Inventors: Yunhao Zhang, Shanghai (CN); Xiuqiang Xu, Shanghai (CN); Yan Chen, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 29 days.

(21) Appl. No.: 17/675,752

(22) Filed: Feb. 18, 2022

(65) Prior Publication Data

US 2022/0174602 A1 Jun. 2, 2022

Related U.S. Application Data

(63) Continuation of application No. PCT/CN2019/102046, filed on Aug. 22, 2019.

(51) Int. Cl.
*H04W 52/02* (2009.01)
*H04L 1/08* (2006.01)
(Continued)

(52) U.S. Cl.
CPC ........... *H04W 52/0232* (2013.01); *H04L 1/08* (2013.01); *H04W 52/0216* (2013.01);
(Continued)

(58) Field of Classification Search
CPC ......... H04W 52/0232; H04W 52/0216; H04W 52/0235; H04W 72/1263; H04W 72/542;
(Continued)

(56) References Cited

U.S. PATENT DOCUMENTS

2019/0036644 A1 1/2019 Wikstrom et al.
2019/0081739 A1* 3/2019 Nammi ................ H04L 1/1858
(Continued)

FOREIGN PATENT DOCUMENTS

CN 107734681 A 2/2018
CN 109327905 A 2/2019
(Continued)

OTHER PUBLICATIONS

Huawei, HiSilicon, "Considerations on 'wake-up signal' for eFeMTC," 3GPP TSG RAN WG1 Meeting #88bis, 3GPP Draft, Apr. 2, 2017, XP051242434, R1-1704282, total 4 pages, 3rd Generation Partnership Project, Valbonne, France (Apr. 3-7, 2017).
(Continued)

*Primary Examiner* — Afshawn M Towfighi
(74) *Attorney, Agent, or Firm* — Leydig, Voit & Mayer, Ltd.

(57) ABSTRACT

This application provides a data transmission method and an apparatus, to reduce a quantity of times of repeated transmission of data, reduce power consumption of a terminal device, save transmission resources, and maintain a high time diversity gain. The method includes: A network device sends first information, and a terminal device receives the first information, where the first information is used to configure K repeated transmission occasions. The network device and the terminal device repeatedly transmit first data on N repeated transmission occasions in the K repeated transmission occasions, where the N repeated transmission occasions are discontinuous in time domain, K is an integer greater than 1, and N is an integer greater than or equal to 1 and less than K.

20 Claims, 6 Drawing Sheets

(51) Int. Cl.
*H04W 72/1263* (2023.01)
*H04W 72/542* (2023.01)

(52) U.S. Cl.
CPC ... *H04W 52/0235* (2013.01); *H04W 72/1263* (2013.01); *H04W 72/542* (2023.01)

(58) Field of Classification Search
CPC ....... H04L 1/08; H04L 1/1887; H04L 1/1819; H04L 1/189
See application file for complete search history.

(56) References Cited

U.S. PATENT DOCUMENTS

2022/0330254 A1* 10/2022 Gao ...................... H04L 5/0051
2023/0141695 A1* 5/2023 Balasubramanian ........................ H04L 5/0098 455/452.2

FOREIGN PATENT DOCUMENTS

| | | | | |
|---|---|---|---|---|
| CN | 110034863 A | | 7/2019 | |
| EP | 1499144 A1 | * | 1/2005 | ........ H04W 52/0216 |
| EP | 3282619 A1 | | 2/2018 | |

OTHER PUBLICATIONS

Sequans, "Enhancements for grant free transmissions," 3GPP TSG RAN WG1 Ad-Hoc Meeting 1901, Tapei, Taiwan, Bgpp Draft, Jan. 11, 2019, XP051576221, R1-1900681, total 6 pages, 3rd Generation Partnership Project, Valbonne, France (Jan. 21-25, 2019).

Source: TSG RAN Chairman, "Preparing for Rel-17," 3GPP TSG RAN Meeting #84, Newport Beach, USA, RP-191519, total 12 pages, 3rd Generation Partnership Project, Valbonne, France (Jun. 3-6, 2019).

EP/19942186.8, Office Action, dated May 9, 2023.

* cited by examiner

REPETITIVE DATA TRANSMISSION METHOD AND APPARATUS

CROSS-REFERENCE TO RELATED APPLICATIONS

This application is a continuation of International Application No. PCT/CN2019/102046, filed on Aug. 22, 2019, the disclosure of which is hereby incorporated by reference in its entirety.

TECHNICAL FIELD

This application relates to the communication field, and in particular, to a data transmission method and an apparatus in the communication field.

BACKGROUND

To improve reliability of data transmission and reduce a transmission delay caused by retransmission, a 5th generation (the fifth generation, 5G) mobile communication system supports repeated transmission of data, that is, a transmit end is allowed to send a plurality of same or different redundancy versions of a same data packet. Before sending a data packet each time, the transmit end does not need to wait for a feedback, for example, a negative acknowledgment (NACK) feedback of a hybrid automatic repeat request (HARQ), of a receive end for the data packet.

A quantity of times of repeated transmission is configured by a network device for a terminal device. In some scenarios in which uplink coverage needs to be ensured, for example, in a massive machine-type communications (mMTC) scenario, a network device usually configures a large quantity of times of repeated transmission for a terminal device. Although this can improve coverage, power consumption of the terminal device is inevitably increased. In addition, interference may also be caused to another terminal device.

SUMMARY

This application provides a data transmission method and an apparatus, to reduce a quantity of times of repeated transmission of data, reduce power consumption of a terminal device, save transmission resources, and maintain a high time diversity gain.

According to a first aspect, a data transmission method is provided. The method includes: A terminal device receives first information, where the first information is used to configure K repeated transmission occasions. The terminal device repeatedly transmits first data on N repeated transmission occasions in the K repeated transmission occasions, where the N repeated transmission occasions are discontinuous in time domain, K is an integer greater than 1, and N is an integer greater than or equal to 1 and less than K.

According to the data transmission method in this embodiment of this application, the terminal device and a network device repeatedly transmit the first data on the N repeated transmission occasions that are discontinuous in time domain, so that a quantity of times of repeated transmission of the first data is reduced from pre-configured K to N. In addition to ensuring reliable transmission of the first data, this can reduce the quantity of times of repeated transmission of the first data, reduce power consumption of the terminal device, and save transmission resources. In addition, because the N repeated transmission occasions are discontinuous in time domain, a total time span of repeated transmission of the first data is large. This can maintain a high time diversity gain, thereby improving system performance.

In this embodiment of this application, only the terminal device is used as an execution body for description. However, it should be understood that the terminal device may be the terminal device, or may be an apparatus (for example, one or more of a chip, a processor, or a chip system) in the terminal device. This is not limited in this application.

In this application, that two repeated transmission occasions are continuous in time domain means that time domain resources occupied by the two repeated transmission occasions are continuous in time; or that two repeated transmission occasions are discontinuous in time domain means that time domain resources occupied by the two repeated transmission occasions are discontinuous in time.

For a plurality of repeated transmission occasions, that the plurality of repeated transmission occasions are continuous in time domain means that any two adjacent repeated transmission occasions in the plurality of repeated transmission occasions are continuous in time domain; or that the plurality of repeated transmission occasions are discontinuous in time domain means that at least two adjacent repeated transmission occasions in the plurality of repeated transmission occasions are discontinuous in time domain. The two adjacent repeated transmission occasions mean that a repeated transmission occasion that belongs to the plurality of repeated transmission occasions does not exist on a time domain resource between the two adjacent repeated transmission occasions.

It should be understood that, if any two adjacent repeated transmission occasions in the plurality of repeated transmission occasions are discontinuous in time domain, it may mean that "the plurality of repeated transmission occasions are all discontinuous in time domain"; or if in the plurality of repeated transmission occasions, two adjacent repeated transmission occasions are discontinuous in time domain, and two other adjacent repeated transmission occasions are continuous in time domain, it may mean that "the plurality of repeated transmission occasions are partially discontinuous in time domain". That "the plurality of repeated transmission occasions are all discontinuous in time domain" and that "the plurality of repeated transmission occasions are partially discontinuous in time domain" may both be understood as that the plurality of repeated transmission occasions are discontinuous in time domain.

With reference to the first aspect, in some implementations of the first aspect, the method further includes: The terminal device receives second information, where the second information is used to indicate repeated transmission performed on the N repeated transmission occasions.

In a first possible implementation, the second information may indicate the N repeated transmission occasions that are in the K repeated transmission occasions and on which repeated transmission is performed. For the other K-N repeated transmission occasions that are not indicated, the terminal device does not transmit data on the other K-N repeated transmission occasions. This manner is more applicable to a scenario in which N is less than K-N, that is, the N repeated transmission occasions need to be indicated, where N is a smaller quantity. This helps reduce signaling overheads of the network device. However, an application scenario of this implementation is not limited in this embodiment of this application.

In a second possible implementation, the second information may indicate K-N repeated transmission occasions that are in the K repeated transmission occasions and on which transmission is muted (mute) or dropped (drop). For the other N repeated transmission occasions that are not indicated, the terminal device transmits data on the N repeated transmission occasions. This manner is more applicable to a scenario in which K-N is less than N, that is, N-K repeated transmission occasions need to be indicated, where N-K is a smaller quantity. This helps reduce signaling overheads of the network device. However, an application scenario of this implementation is not limited in this embodiment of this application.

The second information may be configured by the network device by using higher layer signaling and/or physical layer information. For example, the network device may send, in an explicit manner, the second information to the terminal device by using one or more of RRC signaling, DCI, or a MAC CE. When the N repeated transmission occasions are determined in the explicit manner, a processing delay of the terminal device can be reduced, a processing speed of the terminal device can be improved, and data transmission efficiency can be improved.

With reference to the first aspect, in some implementations of the first aspect, the second information is used to indicate a bitmap, the bitmap includes K bits, the K bits include N 0s or N is, and the N 0s or the N is are used to indicate the N repeated transmission occasions.

It should be noted that, the second information may be the bitmap, a result obtained by processing the bitmap in one or more manners such as encoding, compression, or mapping, or an index of the bitmap in a plurality of predefined bitmaps, or may include an index of a predefined bitmap set and an index of the bitmap in the predefined bitmap set.

With reference to the first aspect, in some implementations of the first aspect, the second information is used to indicate one or more parameters, and there is a correspondence between the one or more parameters and the N repeated transmission occasions.

In a possible implementation, the network device and the terminal device may pre-configure or predefine a distribution pattern of the N repeated transmission occasions, where one distribution pattern corresponds to one index. In this embodiment, the one or more parameters may be an index of a distribution pattern. The terminal device obtains the distribution pattern of the N repeated transmission occasions based on the one or more parameters, to determine the N repeated transmission occasions. Therefore, there is a correspondence between the one or more parameters and the N repeated transmission occasions.

In another possible implementation, the distribution pattern may be represented by using a formula, and the one or more parameters may be the formula, an index of the formula, or one or more parameters in the formula.

With reference to the first aspect, in some implementations of the first aspect, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel PDCCH monitoring cycle indication, or PDCCH monitoring skipping indication.

In this embodiment of this application, the second information is carried on the power saving channel or in the power saving signal, and the terminal device and the network device may reduce the quantity of times of repeated transmission in an on duration phase, that is, reduce the quantity of times of repeated transmission from K to N. This further reduces the power consumption of the terminal device and saves the transmission resources.

With reference to the first aspect, in some implementations of the first aspect, the method further includes: The terminal device receives control information, where there is a correspondence between one or more of a radio network temporary identifier RNTI, a search space SS, or a control resource set CORESET corresponding to the control information and the N repeated transmission occasions.

Optionally, a correspondence between one or more of different RNTIs, different SSs, or different CORESETs and N repeated transmission occasions in different distribution patterns may be pre-configured or predefined.

It should be understood that a plurality of different combinations including one or more of the RNTI, the SS, and the CORESET may be pre-configured or predefined to indicate N repeated transmission occasions in different distribution patterns. Other examples are not enumerated one by one herein. A quantity of implicitly indicated candidates, namely, a quantity of N repeated transmission occasions in different distribution patterns, can be extended by indicating the N repeated transmission occasions by using a plurality of parameters. In this way, the network device more flexibly configures the N repeated transmission occasions for the terminal device. Therefore, this embodiment is applicable to more scenarios.

With reference to the first aspect, in some implementations of the first aspect, the method further includes: The terminal device receives a pilot, where there is a correspondence between a sequence of the pilot and the N repeated transmission occasions.

The sequence of the pilot may be a sequence of a reference signal, or may be a sequence corresponding to a synchronization signal. The pilot may be, for example, a demodulation reference signal (DMRS), a sounding reference signal (SRS), a signal carried on a physical random access channel (PRACH), a phase tracking reference signal (PTRS), or a channel state information-reference signal (CSI-RS). This is not limited in this embodiment of this application. Similar to the foregoing RNTIs, sequences of different pilots may also correspond to N repeated transmission occasions in different distribution patterns. In a possible implementation, the pilot may be carried in a power saving signal or on a power saving channel.

When the N repeated transmission occasions are determined in an implicit manner, signaling overheads of the terminal device can be reduced, transmission resources can be saved, and processing flexibility of the terminal device can be improved by using this method.

With reference to the first aspect, in some implementations of the first aspect, that the terminal device repeatedly transmits first data on N repeated transmission occasions in the K repeated transmission occasions includes: The terminal device repeatedly transmits the first data on the N repeated transmission occasions in a first time period.

With reference to the first aspect, in some implementations of the first aspect, a first threshold M may be pre-configured or predefined, where M is an integer greater than 1. That the terminal device repeatedly transmits first data on N repeated transmission occasions in the K repeated transmission occasions includes: When a total quantity of times of transmission is less than or equal to the first threshold M, the terminal device repeatedly transmits the first data on the N repeated transmission occasions. Correspondingly, that the network device repeatedly transmits the first data on the N repeated transmission occasions in the K repeated transmission occasions includes: When a total quantity of times of transmission is less than or equal to the first threshold M, the network device repeatedly transmits the first data on the N repeated transmission occasions.

It should be understood that, a quantity of times of data transmission in one transmission cycle is N, and since the first data is transmitted on the N repeated transmission occasions, a total quantity of times of transmission in P transmission cycles is P*N, where P is an integer greater than or equal to 1.

With reference to the first aspect, in some implementations of the first aspect, a second threshold Q may be pre-configured or predefined, where Q is an integer greater than 1. That the terminal device repeatedly transmits first data on N repeated transmission occasions in the K repeated transmission occasions includes: When a total quantity of transmission cycles is less than or equal to the second threshold Q, the terminal device repeatedly transmits the first data on the N repeated transmission occasions. Correspondingly, that the network device repeatedly transmits the first data on the N repeated transmission occasions in the K repeated transmission occasions includes: When a total quantity of transmission cycles is less than or equal to the second threshold Q, the network device repeatedly transmits the first data on the N repeated transmission occasions.

It should be understood that, a quantity of times of data transmission in one transmission cycle is N, and the total quantity of transmission cycles is a total quantity of transmission cycles since the first data is transmitted on the N repeated transmission occasions.

In this embodiment of this application, a time period or a threshold is pre-configured or predefined, so that the quantity of times of repeated transmission of data can be more flexibly adjusted based on an actual situation. This improves data transmission efficiency.

According to a second aspect, another data transmission method is provided. The method includes: A network device sends first information, where the first information is used to configure K repeated transmission occasions. The network device repeatedly transmits first data on N repeated transmission occasions in the K repeated transmission occasions, where the N repeated transmission occasions are discontinuous in time domain, K is an integer greater than 1, and N is an integer greater than or equal to 1 and less than K.

According to the data transmission method in this embodiment of this application, a terminal device and the network device repeatedly transmit the first data on the N repeated transmission occasions that are discontinuous in time domain, so that a quantity of times of repeated transmission of the first data is reduced from pre-configured K to N. In addition to ensuring reliable transmission of the first data, this can reduce the quantity of times of repeated transmission of the first data, reduce power consumption of the terminal device, and save transmission resources. In addition, because the N repeated transmission occasions are discontinuous in time domain, a total time span of repeated transmission of the first data is large. This can maintain a high time diversity gain, thereby improving system performance.

In this embodiment of this application, only the network device is used as an execution body for description. However, it should be understood that the network device may be the network device, or may be an apparatus (for example, one or more of a chip, a processor, or a chip system) in the network device. This is not limited in this application.

With reference to the second aspect, in some implementations of the second aspect, the method further includes: The network device sends second information, where the second information is used to indicate repeated transmission performed on the N repeated transmission occasions.

With reference to the second aspect, in some implementations of the second aspect, the second information is used to indicate a bitmap, the bitmap includes K bits, the K bits include N 0s or N 1s, and the N 0s or the N 1s are used to indicate the N repeated transmission occasions.

With reference to the second aspect, in some implementations of the second aspect, the second information is used to indicate one or more parameters, and there is a correspondence between the one or more parameters and the N repeated transmission occasions.

With reference to the second aspect, in some implementations of the second aspect, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel PDCCH monitoring cycle indication, or PDCCH monitoring skipping indication.

With reference to the second aspect, in some implementations of the second aspect, the method further includes: The network device sends control information, where there is a correspondence between one or more of a radio network temporary identifier, a search space, or a control resource set corresponding to the control information and the N repeated transmission occasions.

With reference to the second aspect, in some implementations of the second aspect, the method further includes: The network device sends a pilot, where there is a correspondence between a sequence of the pilot and the N repeated transmission occasions.

With reference to the second aspect, in some implementations of the second aspect, that the network device repeatedly transmits first data on N repeated transmission occasions in the K repeated transmission occasions includes: The network device repeatedly transmits the first data on the N repeated transmission occasions in a first time period.

According to a third aspect, an apparatus is provided. The apparatus is configured to perform the method according to any one of the foregoing aspects or the possible implementations of the foregoing aspects. Specifically, the apparatus includes a unit configured to perform the method according to any one of the foregoing aspects or the possible implementations of the foregoing aspects.

In a design, the apparatus may include modules that are in a one-to-one correspondence with the method/operations/steps/actions according to any one of the foregoing aspects. The modules may be implemented by a hardware circuit, software, or a combination of a hardware circuit and software.

In another design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

In another design, the apparatus is configured to perform the method according to any one of the foregoing aspects or the possible implementations of the foregoing aspects. The apparatus may be disposed in the terminal device or the network device, or the apparatus is the terminal device or the network device.

According to a fourth aspect, another apparatus is provided. The apparatus includes a processor and a memory. The memory is configured to store a computer program, and the processor is configured to invoke the computer program from the memory and run the computer program, to enable the apparatus to perform the method according to any one of the possible implementations of the foregoing aspects.

Optionally, there are one or more processors and one or more memories.

Optionally, the memory may be integrated with the processor, or the memory and the processor are separately disposed.

Optionally, the communication device further includes a transmitter and a receiver. The transmitter and the receiver may be separately disposed, or may be integrated together to obtain a transceiver.

According to a fifth aspect, a communication system is provided. The communication system includes an apparatus configured to implement the method according to any one of the first aspect or the possible implementations of the first aspect, and an apparatus configured to implement the method according to any one of the second aspect or the possible implementations of the second aspect.

In a possible design, the communication system may further include another device interacting with the terminal device and/or the network device in the solutions provided in the embodiments of this application.

According to a sixth aspect, a computer program product is provided. The computer program product includes a computer program (which may also be referred to as code or instructions). When the computer program is run, a computer is enabled to perform the method according to any one of the possible implementations of the foregoing aspects.

According to a seventh aspect, a computer-readable medium is provided. The computer-readable medium stores a computer program (which may also be referred to as code or instructions). When the computer program is run on a computer, the computer is enabled to perform the method according to any one of the possible implementations of the foregoing aspects.

According to an eighth aspect, a chip system is provided. The chip system includes a memory and a processor. The memory is configured to store a computer program, and the processor is configured to invoke the computer program from the memory and run the computer program, to enable a communication device on which the chip system is installed to perform the method according to any one of the possible implementations of the foregoing aspects.

The chip system may include an input circuit or interface configured to send information or data, and an output circuit or interface configured to receive information or data.

DESCRIPTION OF EMBODIMENTS

Figure 1:
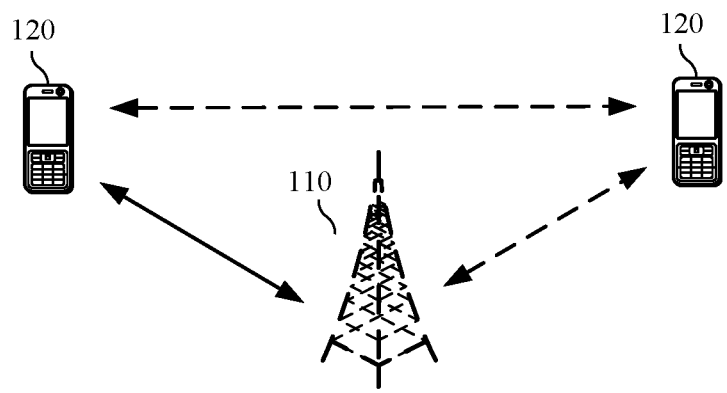
FIG. 1 is a schematic diagram of a communication system according to an embodiment of this application.

Technical solutions in embodiments of this application may be applied to various communication systems, such as a long term evolution (LTE) system, an LTE frequency division duplex (FDD) system, an LTE time division duplex (TDD) system, a 5th generation (5G) system or a new radio (NR) system, or another evolved communication system.

A terminal device in the embodiments of this application may also be referred to as user equipment (UE), a mobile station (MS), a mobile terminal (MT), an access terminal, a subscriber unit, a subscriber station, a mobile station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device having a wireless connection function or a vehicle-mounted device. Currently, some examples of a terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile communication network (PLMN). This is not limited in the embodiments of this application.

By way of example and not limitation, the terminal device in the embodiments of this application may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in the embodiments of this application may alternatively be a terminal device in an internet of things (IoT) system. IoT is an important part of future development of information technologies. A main technical feature of the IoT is connecting a thing to a network by using a communication technology, to implement an intelligent network for human-machine interconnection and thing-thing interconnection. The terminal device in the embodiments of this application may alternatively be a terminal device in machine type communication (MTC). The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application. Therefore, the embodiments of this application may be applied to the internet of vehicles, for example, vehicle to everything (V2X), long term evolution-vehicle (LTE-V), or vehicle-to-vehicle (V2V).

In addition, a network device in the embodiments of this application may be a device used to communicate with the terminal device. The network device may also be referred to as an access network device or a wireless access network device, and may be a transmission reception point (TRP), an evolved NodeB (eNB or eNodeB) in an LTE system, a home base station (for example, a home evolved NodeB or a home NodeB, HNB), a baseband unit (BBU), or a wireless controller in a cloud radio access network (CRAN) scenario. Alternatively, the network device may be a relay station, an access point, a vehicle-mounted device, a wearable device, a network device in a 5G network, a network device in a future evolved PLMN network, or the like; or may be an access point (AP) in a WLAN or a gNB in an NR system. Alternatively, the network device may be a city base station, a micro base station, a pico base station, a femto base station, or the like. This is not limited in the embodiments of this application.

In a network structure, the network device may include a centralized unit (CU) node, a distributed unit (DU) node, a radio access network (RAN) device including a CU node and a DU node, or a RAN device including a control plane CU node (CU-CP node), a user plane CU node (CU-UP node), and a DU node.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

For ease of understanding the embodiments of this application, a communication system applicable to the embodiments of this application is first described in detail with reference to FIG. 1.

FIG. 1 shows a communication system 100 to which an embodiment of this application is applied. The communication system 100 may include at least one network device 110. The network device 110 may be a device, for example, a base station or a base station controller, that communicates with a terminal device. Each network device 110 may provide communication coverage for a specific geographical area, and may communicate with a terminal device located in the coverage area (a cell). The wireless communication system 100 further includes one or more terminal devices 120 in coverage of the network device 110. The terminal device 120 may be mobile or fixed.

FIG. 1 shows an example of one network device and two terminal devices. Optionally, the communication system 100 may include a plurality of network devices, and another quantity of terminal devices may be included in coverage of one network device. This is not limited in this embodiment of this application.

Optionally, the wireless communication system 100 may further include another network entity such as a network controller or a mobility management entity. This is not limited in this embodiment of this application.

Repeated transmission means that a transmit end is allowed to send a plurality of same or different redundancy versions of a same data packet on continuous or discontinuous time domain resources. Before sending a data packet each time, the transmit end does not need to wait for a feedback, for example, a negative acknowledgment (NACK) feedback of a hybrid automatic repeat request (HARQ), of a receive end for the data packet. A quantity of times of repeated transmission is configured by the network device for the terminal device. In some scenarios in which uplink coverage needs to be ensured, for example, in a massive machine-type communications (mMTC) scenario, a network device usually configures a large quantity of times of repeated transmission for a terminal device. Although this can improve coverage, power consumption of the terminal device is inevitably increased. In addition, interference may also be caused to another terminal device.

In view of this, the embodiments of this application provide a data transmission method, to reduce a quantity of times of repeated transmission of data, reduce the power consumption of the terminal device, save transmission resources, and maintain a high time diversity gain.

For ease of understanding the embodiments of this application, the following descriptions are first briefly provided.

In the embodiments of this application, higher layer signaling may be, for example, radio resource control (RRC) signaling, or may be other higher layer signaling, for example, a medium access control (MAC) control element (CE). Physical layer information may be, for example, downlink control information (DCI), or may be other physical layer information. This is not limited in this application. The physical layer information in the embodiments of this application may be carried on a physical channel, and the physical channel may be, for example, a physical downlink control channel (PDCCH) or a physical downlink shared channel (PDSCH).

In the embodiments of this application, "being used for an indication" may indicate "being used for a direct indication" or "being used for an indirect indication", or the "indication" may include an explicit indication or an implicit indication. Information indicated by a piece of information (for example, information used to indicate a repeated transmission occasion described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, a part of the to-be-indicated information may be indicated, and the other part of the to-be-indicated information is predefined. For example, it may alternatively be predefined (for example, specified in a protocol) that the to-be-indicated information is to be indicated depending on whether an information element exists. In this way, indication overheads are reduced to some extent.

The following describes in detail the embodiments provided in this application with reference to the accompanying drawings.

Figure 2:
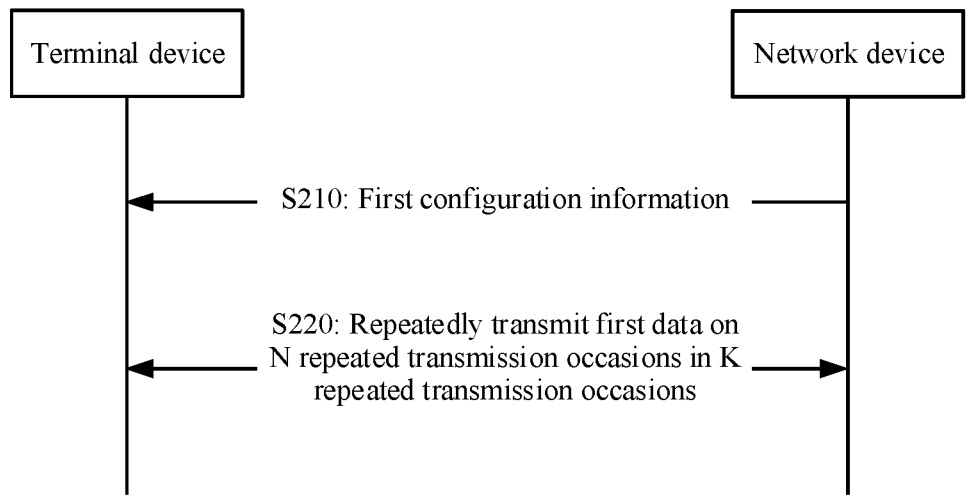
FIG. 2 is a schematic flowchart of a data transmission method according to an embodiment of this application.

FIG. 2 is a schematic flowchart of a data transmission method 200 according to an embodiment of this application. The method 200 may be applied to the communication system 100 shown in FIG. 1, but this embodiment of this application is not limited thereto.

S210: A network device sends first information, and correspondingly a terminal device receives the first information, where the first information is used to configure K repeated transmission occasions.

S220: The terminal device and the network device repeatedly transmit first data on N repeated transmission occasions in the K repeated transmission occasions, where the N repeated transmission occasions are discontinuous in time domain, K is an integer greater than 1, and N is an integer greater than or equal to 1 and less than K.

According to the data transmission method in this embodiment of this application, the terminal device and the network device repeatedly transmit the first data on the N repeated transmission occasions that are discontinuous in time domain, so that a quantity of times of repeated transmission of the first data is reduced from pre-configured K to N. In addition to ensuring reliable transmission of the first data, this can reduce the quantity of times of repeated transmission of the first data, reduce power consumption of the terminal device, and save transmission resources. In addition, because the N repeated transmission occasions are discontinuous in time domain, a total time span of repeated transmission of the first data is large. This can maintain a high time diversity gain, thereby improving system performance.

That the terminal device and the network device transmit the first data may include: The terminal device sends uplink data to the network device, and the network device receives the uplink data. In this case, the terminal device serves as a transmit end, and the network device serves as a receive end. Alternatively, that the terminal device and the network device transmit the first data may include: The network device sends downlink data to the terminal device, and the terminal device receives the downlink data. In this case, the terminal device serves as a receive end, and the network device serves as a transmit end. This is not limited in this embodiment of this application.

It should be understood that a time domain resource used for repeated transmission is referred to as a repeated transmission occasion (transmission occasion, TO). In this application, that two repeated transmission occasions are continuous in time domain means that time domain resources occupied by the two repeated transmission occasions are continuous in time; or that two repeated transmission occasions are discontinuous in time domain means that time domain resources occupied by the two repeated transmission occasions are discontinuous in time.

For a plurality of repeated transmission occasions, that the plurality of repeated transmission occasions are continuous in time domain means that any two adjacent repeated transmission occasions in the plurality of repeated transmission occasions are continuous in time domain; or that the plurality of repeated transmission occasions are discontinuous in time domain means that at least two adjacent repeated transmission occasions in the plurality of repeated transmission occasions are discontinuous in time domain. The two adjacent repeated transmission occasions mean that a repeated transmission occasion that belongs to the plurality of repeated transmission occasions does not exist on a time domain resource between the two adjacent repeated transmission occasions.

It should be understood that, if any two adjacent repeated transmission occasions in the plurality of repeated transmission occasions are discontinuous in time domain, it may mean that "the plurality of repeated transmission occasions are all discontinuous in time domain"; or if in the plurality of repeated transmission occasions, two adjacent repeated transmission occasions are discontinuous in time domain, and two other adjacent repeated transmission occasions are continuous in time domain, it may mean that "the plurality of repeated transmission occasions are partially discontinuous in time domain". That "the plurality of repeated transmission occasions are all discontinuous in time domain" and that "the plurality of repeated transmission occasions are partially discontinuous in time domain" may both be understood as that the plurality of repeated transmission occasions are discontinuous in time domain.

Therefore, that "the N repeated transmission occasions are discontinuous in time domain" means that at least two adjacent repeated transmission occasions in the N repeated transmission occasions are discontinuous in time domain. In other words, the N repeated transmission occasions may be all or partially discontinuous in time domain. This is not limited in this embodiment of this application.

It should be further understood that, the "first information" may also be referred to as "first configuration information" or may have another name, and the first information may be configured by using higher layer signaling and/or physical layer information. For example, in a possible configuration manner of uplink grant-free transmission, the network device may send the first information by using the higher layer signaling. The first information may include one or more of cycle information, time domain resource information, frequency domain resource information, a demodulation reference signal, a modulation and coding scheme, a redundancy version, the quantity K of times of repeated transmission, or the like. The terminal device may receive the first information, and periodically transmit the uplink data on a configured time domain resource and a configured frequency domain resource based on the configured cycle information, to achieve a semi-persistent transmission effect. In one cycle, to-be-transmitted data may be repeatedly transmitted for K times according to the redundancy version configured in the first information.

The K repeated transmission occasions configured by using the first information may be continuous or discontinuous in time domain. This is not limited in this embodiment of this application.

Figure 3:
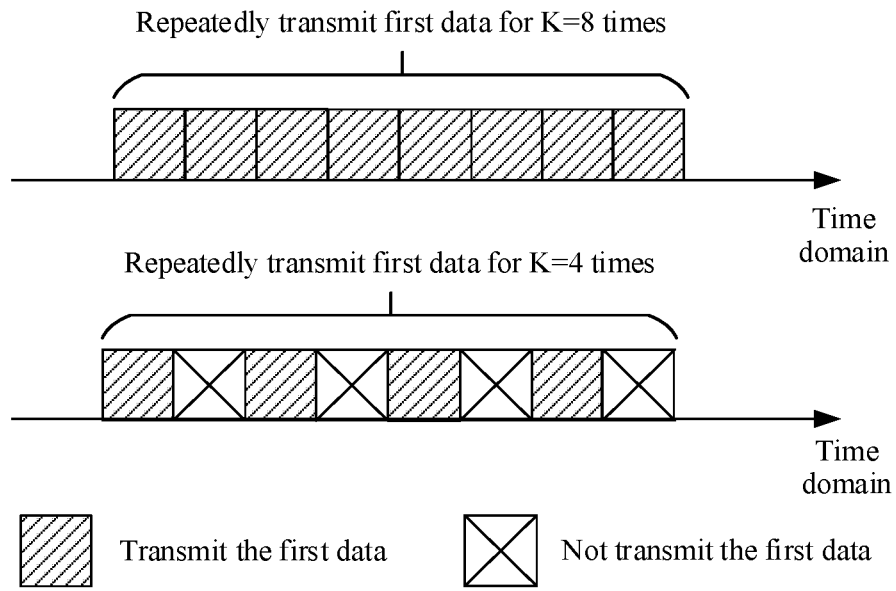
FIG. 3 is a schematic diagram of distribution of repeated transmission occasions used for data transmission according to an embodiment of this application.
Figure 4:
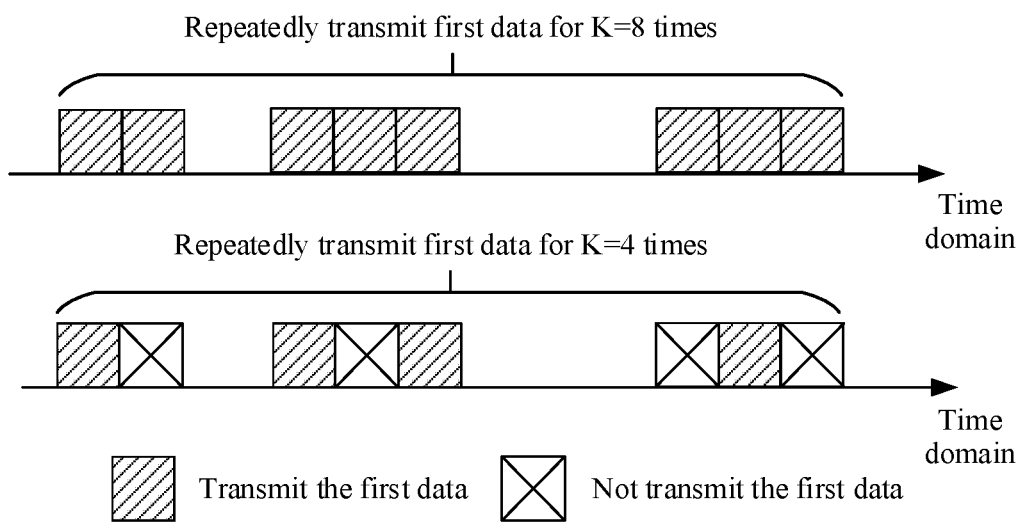
FIG. 4 is another schematic diagram of distribution of repeated transmission occasions used for data transmission according to an embodiment of this application.

FIG. 3 and FIG. 4 are two schematic diagrams of possible distribution of repeated transmission occasions used in the data transmission method according to this application. In FIG. 3, the K repeated transmission occasions are continuous in time domain. Assuming that K=8 and N=4, identifiers corresponding to the repeated transmission occasions may be 0 to 7. Transmission is performed on the N repeated transmission occasions once at an interval of one repeated transmission occasion in the K repeated transmission occasions, and identifiers corresponding to the repeated transmission occasions may be 0, 2, 4, and 6. In FIG. 4, the K repeated transmission occasions are discontinuous in time domain. Assuming that K=8 and N=4, identifiers corresponding to the repeated transmission occasions may be 0, 1, 3 to 5, and 9 to 11. Transmission is performed on the N repeated transmission occasions once at an interval of one repeated transmission occasion in the K repeated transmission occasions, and identifiers corresponding to the repeated transmission occasions may be 0, 3, 5, and 10.

Figure 5:
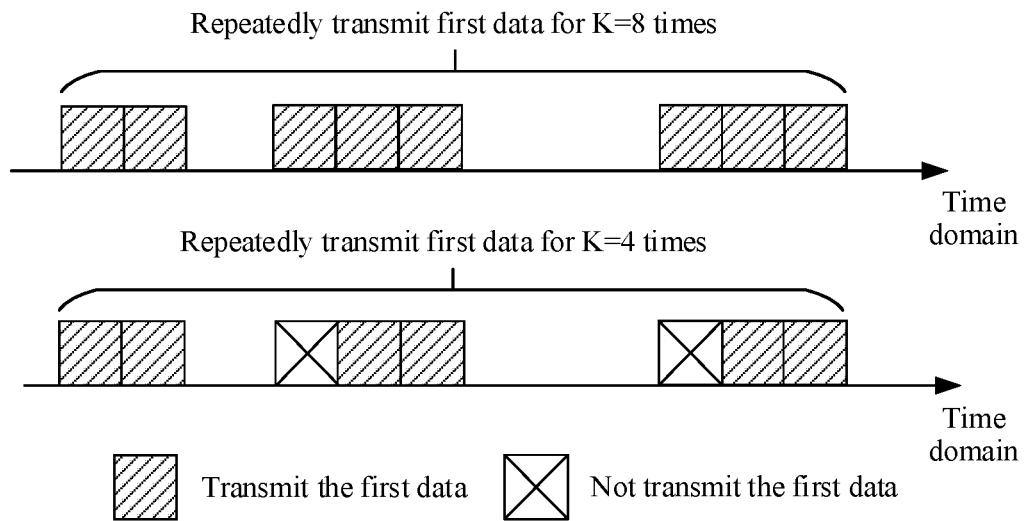
FIG. 5 is another schematic diagram of distribution of repeated transmission occasions used for data transmission according to an embodiment of this application.

Because in both FIG. 3 and FIG. 4, transmission is performed on the N repeated transmission occasions once at an interval of one repeated transmission occasion, the N repeated transmission occasions are all discontinuous in time domain. FIG. 5 is another schematic diagram of possible distribution of repeated transmission occasions used in the data transmission method according to this application. In FIG. 5, the K repeated transmission occasions are discontinuous in time domain. Assuming that K=8 and N=4, identifiers corresponding to the repeated transmission occasions may be 0, 1, 3 to 5, and 9 to 11. Transmission is performed on the N repeated transmission occasions once at an interval of two repeated transmission occasions in the K repeated transmission occasions, and identifiers corresponding to the repeated transmission occasions may be 0, 1, 4, 5, 10, and 11. Therefore, the N repeated transmission occasions are partially discontinuous in time domain.

Although this embodiment of this application shows a procedure of data transmission between the terminal device and the network device, it should be understood that the method in this embodiment of this application is not limited to this scenario, and may alternatively be applied to data transmission between terminal devices, for example, sidelink transmission. This is not limited in this embodiment of this application. For example, the method in this embodiment of this application may alternatively be applied to other communication such as vehicle to X (V2X) communication, device-to-device (D2D) communication (for example, communication between UEs), or relay communication.

In a scenario in which data transmission is performed between the terminal devices, the first information may be configured by the network device for the terminal device in this embodiment of this application, or may be configured by another terminal device for the terminal device in this embodiment of this application. This is not limited herein.

In this embodiment of this application, the network device may indicate the N repeated transmission occasions in the K repeated transmission occasions to the terminal device in a plurality of manners. The following mainly describes two cases: an explicit indication and an implicit indication.

Case 1: The network device enables the terminal device to obtain the N repeated transmission occasions in an explicit indication manner.

In an optional embodiment, the method further includes: The network device sends second information, and correspondingly the terminal device receives the second information, where the second information is used to indicate repeated transmission performed on the N repeated transmission occasions.

In a first possible implementation, the second information may indicate the N repeated transmission occasions that are in the K repeated transmission occasions and on which repeated transmission is performed. For the other K-N repeated transmission occasions that are not indicated, the terminal device does not transmit data on the other K-N repeated transmission occasions. This manner is more applicable to a scenario in which N is less than K-N, that is, the N repeated transmission occasions need to be indicated, where N is a smaller quantity. This helps reduce signaling overheads of the network device. However, an application scenario of this implementation is not limited in this embodiment of this application.

In a second possible implementation, the second information may indicate K-N repeated transmission occasions that are in the K repeated transmission occasions and on which transmission is muted (mute) or dropped (drop). For the other N repeated transmission occasions that are not indicated, the terminal device transmits data on the N repeated transmission occasions. This manner is more applicable to a scenario in which K-N is less than N, that is, N-K repeated transmission occasions need to be indicated, where N-K is a smaller quantity. This helps reduce signaling overheads of the network device. However, an application scenario of this implementation is not limited in this embodiment of this application.

It should be understood that the terminal device may obtain which of the foregoing two possible implementations is the indication manner used by the network device. For example, the network device and the terminal device may determine, in a signaling indication manner or a predefined manner, to use the first implementation or the second implementation. This manner is simple to implement, and the terminal device does not need to perform excessive determining. This reduces load of the terminal device, and helps reduce the power consumption of the terminal device. For example, the network device and the terminal device may alternatively determine, based on values of N and K-N, to use the first implementation or the second implementation.

This manner is more flexible, and helps reduce signaling overheads of the network device.

The second information may be configured by the network device by using higher layer signaling and/or physical layer information. For example, the network device may send, in an explicit manner, the second information to the terminal device by using one or more of RRC signaling, DCI, or a MAC CE.

In an optional embodiment, the second information is used to indicate a bitmap, the bitmap includes K bits, the K bits include N 0s or N 1s, and the N 0s or the N 1s are used to indicate the N repeated transmission occasions.

For example, the K bits include N 0s, and the N 0s are used to indicate the N repeated transmission occasions. FIG. 3 and FIG. 4 are used as examples. The K bits indicated by the second information may be 01010101. Alternatively, the K bits include N 1s, and the N 1s are used to indicate the N repeated transmission occasions. FIG. 3 and FIG. 4 are used as examples. The K bits indicated by the second information may be 10101010.

It should be noted that, the second information may be the bitmap, a result obtained by processing the bitmap in one or more manners such as encoding, compression, or mapping, or an index of the bitmap in a plurality of predefined bitmaps, or may include an index of a predefined bitmap set and an index of the bitmap in the predefined bitmap set.

In an optional embodiment, the second information is used to indicate one or more parameters, and there is a correspondence between the one or more parameters and the N repeated transmission occasions.

In a possible implementation, the network device and the terminal device may pre-configure or predefine a distribution pattern (pattern) of the N repeated transmission occasions, where one distribution pattern corresponds to one index (index). In this embodiment, the one or more parameters may be an index of a distribution pattern. The terminal device obtains the distribution pattern of the N repeated transmission occasions based on the one or more parameters, to determine the N repeated transmission occasions. Therefore, there is a correspondence between the one or more parameters and the N repeated transmission occasions.

Table 1 shows an example of a possible distribution pattern according to this embodiment of this application. In Table 1, a distribution pattern corresponding to an index 1 is: One repeated transmission occasion is muted at an interval of one repeated transmission occasion, and a total of K-N repeated transmission occasions are muted. A distribution pattern corresponding to an index 2 is: Transmission is performed on one repeated transmission occasion at an interval of two repeated transmission occasions, and repeated transmission is performed on a total of N repeated transmission occasions. A distribution pattern corresponding to an index 3 is: Two repeated transmission occasions are muted at an interval of two repeated transmission occasions, and a total of K-N repeated transmission occasions are muted. Alternatively, another distribution pattern may be pre-configured or predefined. For example, transmission is performed on one repeated transmission occasion at an interval of three repeated transmission occasions; or transmission is performed on two repeated transmission occasions at an interval of one repeated transmission occasion. Other examples are not enumerated one by one herein. FIG. 3 and FIG. 4 are used as examples. If the parameters in this embodiment are used, the second information may be the index 1.

TABLE 1

| Index | Distributed pattern |
| --- | --- |
| 1 | One repeated transmission occasion is muted at an interval of one repeated transmission occasion, and a total of K − N repeated transmission occasions are muted |
| 2 | Transmission is performed on one repeated transmission occasion at an interval of two repeated transmission occasions, and repeated transmission is performed on a total of N repeated transmission occasions |
| 3 | Two repeated transmission occasions are muted at an interval of two repeated transmission occasions, and a total of K − N repeated transmission occasions are muted |
| ... | ... |

It should be understood that values of the indexes are merely examples for description, and do not constitute a limitation on the scope of this embodiment of this application. For example, the values of the indexes may also start from 0.

In another possible implementation, the distribution pattern may be represented by using a formula, and the one or more parameters may be the formula, an index of the formula, or one or more parameters in the formula.

FIG. 3 and FIG. 4 are used as examples. A pre-configured or predefined formula is $f(n)=n \mod 2$, where $n \in \{1, 2, \ldots, K\}$. A case in which $n=1$ corresponds to the first repeated transmission occasion in the K repeated transmission occasions. A case in which $n=2$ corresponds to the second repeated transmission occasion in the K repeated transmission occasions. The same rule applies to other cases. A case in which $n=K$ corresponds to the $K^{th}$ repeated transmission occasion in the K repeated transmission occasions. $f(n)=1$ indicates transmission, and $f(n)=0$ indicates no transmission. In this case, the network device may indicate the formula by using the second information. The terminal device sequentially calculates $f(n)$ corresponding to each of the K repeated transmission occasions, and determines the N repeated transmission occasions based on a calculation result.

In a possible implementation, the network device may indicate the formula by using a parameter in the second information. For example, $f(n)=n \mod 2$.

In another possible implementation, the formula may be pre-configured or predefined. For example, $f(n)=n \mod l$, where a parameter l is a positive integer. The network device may indicate the parameter l in the formula by using a parameter in the second information, for example, indicate the parameter l=2. In this way, the terminal device obtains the formula $f(n)=n \mod 2$.

In another possible implementation, a plurality of formulas may be pre-configured or predefined, and each formula corresponds to one index. For example, an index of $f(n)=n \mod 2$ is 1, and an index of $f(n)=n \mod 3$ is 2. The network device may indicate the index 1 of the formula $f(n)=n \mod 2$ by using a parameter in the second information. In this way, the terminal device obtains the formula $f(n)=n \mod 2$.

It should be understood that, the foregoing formula is merely an example for description, and $f(n)=n \mod 2$ may be replaced with one or more other formulas. This is not limited in this embodiment of this application.

In addition, the terminal device may obtain in advance a meaning of a value of the used formula. For example, for the formula $f(n)=n \mod 2$ $f(n)=1$ indicates transmission, and $f(n)=0$ indicates no transmission; or $f(n)=0$ indicates transmission, and $f(n)=1$ indicates no transmission. For another example, for the formula $f(n)=n \mod 3$ $f(n)=2$ indicates transmission, $f(n)=1$ indicates transmission, and $f(n)=0$ indicates no transmission; or $f(n)=2$ indicates transmission, f(n)=1 indicates no transmission, and f(n)=0 indicates no transmission; or f(n)=2 indicates no transmission, f(n)=1 indicates no transmission, and f(n)=0 indicates transmission. The meaning of the foregoing value may be configured by the network device for the terminal device by using signaling, or may be predefined. This is not limited in this embodiment of this application.

In an optional embodiment, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel (physical downlink control channel, PDCCH) monitoring cycle indication, or PDCCH monitoring skipping indication.

Figure 6:
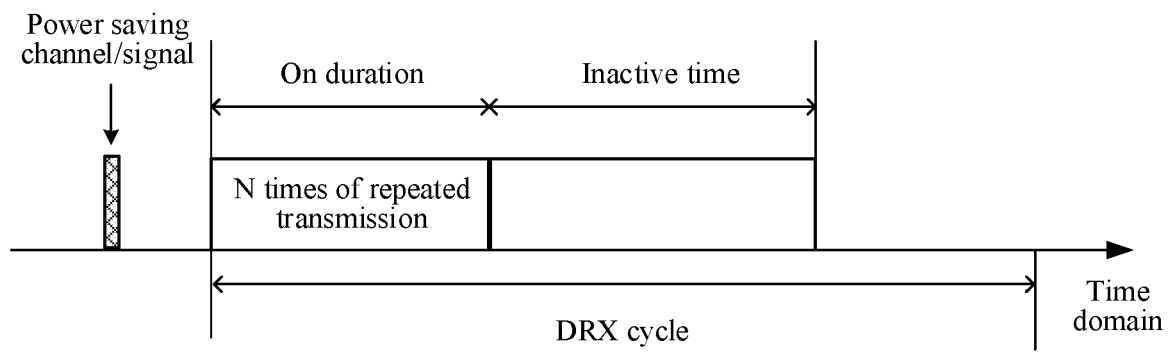
FIG. 6 is a schematic diagram of a discontinuous reception cycle according to an embodiment of this application.

The power saving channel or the power saving signal is sent by the network device to the terminal device. For example, as shown in FIG. 6, the terminal device may receive the power saving signal (power saving signal, PoSS) or the power saving channel (power saving channel, PoSC) sent by the network device, and perform, based on the PoSS or the PoSC, an operation such as sending and receiving information with low power consumption in an on duration (on duration) phase in a next discontinuous reception (discontinuous reception, DRX) cycle. In an inactive (inactivity) phase, the terminal device is in an inactive state, for example, does not monitor a PDCCH or enters a sleep state, to reduce the power consumption of the terminal device. Discontinuous reception DRX means that the terminal device is in an active state in a part of a configured cycle (referred to as the DRX cycle), and the terminal device in the active state and the network device remain in a connected state. The terminal device is in an inactive state in another part of the DRX cycle, and the terminal device in the inactive state may monitor control information of the network device in a small part of time, or may not monitor scheduling information of the network device, or may not receive data sent by another network element, or may not send data to another network element, or the like, to reduce the power consumption of the terminal device.

In this embodiment of this application, the second information is carried in the PoSS or on the PoSC, and the terminal device and the network device may reduce the quantity of times of repeated transmission in the on duration phase, that is, reduce the quantity of times of repeated transmission from K to N. This further reduces the power consumption of the terminal device and saves the transmission resources.

Case 2: The network device enables the terminal device to determine the N repeated transmission occasions in an implicit indication manner.

In an optional embodiment, the method further includes: The network device sends control information, and correspondingly the terminal device receives the control information, where there is a correspondence between one or more of a radio network temporary identifier (RNTI), a search space (SS), or a control resource set (CORESET) corresponding to the control information and the N repeated transmission occasions.

For example, a correspondence between one or more of different RNTIs, different SSs, or different CORESETs and N repeated transmission occasions in different distribution patterns may be pre-configured or predefined.

For example, an RNTI 1 may correspond to N repeated transmission occasions in a distribution pattern 1; an RNTI 2 may correspond to N repeated transmission occasions in a distribution pattern 2; or an RNTI 3 may correspond to N repeated transmission occasions in a distribution pattern 3. After receiving control information scrambled by using the RNTI 1, the terminal device can determine the N repeated transmission occasions in the distribution pattern corresponding to the RNTI 1. The SS and the CORESET are similar to the RNTI. Details are not described herein again.

For another example, an RNTI 1 and an SS 1 may correspond to N repeated transmission occasions in a distribution pattern 1; an RNTI 2 and a CORESET 1 may correspond to N repeated transmission occasions in a distribution pattern 2; an SS 1 and a CORESET 2 may correspond to N repeated transmission occasions in a distribution pattern 3; or an RNTI 1, an SS 1, and a CORESET 1 may correspond to N repeated transmission occasions in a distribution pattern 4.

It should be understood that a plurality of different combinations including one or more of the RNTI, the SS, and the CORESET may be pre-configured or predefined to indicate N repeated transmission occasions in different distribution patterns. Other examples are not enumerated one by one herein. A quantity of implicitly indicated candidates, namely, a quantity of N repeated transmission occasions in different distribution patterns, can be extended by indicating the N repeated transmission occasions by using a plurality of parameters. In this way, the network device more flexibly configures the N repeated transmission occasions for the terminal device. Therefore, this embodiment is applicable to more scenarios.

In an optional embodiment, the method further includes: The network device sends a pilot, and correspondingly the terminal device receives the pilot, where there is a correspondence between a sequence of the pilot and the N repeated transmission occasions.

The sequence of the pilot may be a sequence of a reference signal, or may be a sequence corresponding to a synchronization signal. The pilot may be, for example, a demodulation reference signal (DMRS), a sounding reference signal (SRS), a signal carried on a physical random access channel (PRACH), a phase tracking reference signal (PTRS), or a channel state information-reference signal (CSI-RS). This is not limited in this embodiment of this application. Similar to the foregoing RNTIs, sequences of different pilots may also correspond to N repeated transmission occasions in different distribution patterns. In a possible implementation, the pilot may be carried in a power saving signal or on a power saving channel.

It should be understood that, when the N repeated transmission occasions are determined in an implicit manner, signaling overheads of the terminal device can be reduced, transmission resources can be saved, and processing flexibility of the terminal device can be improved by using this method; or when the N repeated transmission occasions are determined in an explicit manner, a processing delay of the terminal device can be reduced, a processing speed of the terminal device can be improved, and data transmission efficiency can be improved.

In an optional embodiment, that the terminal device repeatedly transmits the first data on the N repeated transmission occasions in the K repeated transmission occasions includes: The terminal device repeatedly transmits the first data on the N repeated transmission occasions in a first time period. That the network device repeatedly transmits the first data on the N repeated transmission occasions in the K repeated transmission occasions includes: The network device repeatedly transmits the first data on the N repeated transmission occasions in a first time period.

That is, the network device and the terminal device repeatedly transmit the first data on the N repeated transmission occasions in the first time period by using the method in this embodiment of this application. In other words, effective duration in which the data is repeatedly transmitted on the N repeated transmission occasions is the first time period. When the first time period expires, the terminal device and the network device may resume data transmission performed on the K repeated transmission occasions, or may perform data transmission based on another quantity of times of repeated transmission. This is not limited in this embodiment of this application.

For example, the terminal device and the network device may start a timer when starting to perform transmission on the N repeated transmission occasions, and preset duration of the timer is the first time period. The first data is transmitted on the N repeated transmission occasions before the timer expires, and transmission performed on the K repeated transmission occasions is resumed after the timer expires (that is, the first time period expires).

The first time period may be predefined, or may be configured by the network device for the terminal device by using signaling.

In an optional embodiment, a first threshold M may be pre-configured or predefined, where M is an integer greater than 1. That the terminal device repeatedly transmits the first data on the N repeated transmission occasions in the K repeated transmission occasions includes: When a total quantity of times of transmission is less than or equal to the first threshold M, the terminal device repeatedly transmits the first data on the N repeated transmission occasions. Correspondingly, that the network device repeatedly transmits the first data on the N repeated transmission occasions in the K repeated transmission occasions includes: When a total quantity of times of transmission is less than or equal to the first threshold M, the network device repeatedly transmits the first data on the N repeated transmission occasions.

It should be understood that, a quantity of times of data transmission in one transmission cycle is N, and since the first data is transmitted on the N repeated transmission occasions, a total quantity of times of transmission in P transmission cycles is P*N, where P is an integer greater than or equal to 1. That is, when P*N is less than or equal to M, the network device and the terminal device repeatedly transmit the first data on the N repeated transmission occasions. Assuming that P*N is less than M, and (P+1)*N is greater than M, the terminal device and the network device may resume transmission performed on the K repeated transmission occasions from a $(P+1)^{th}$ transmission cycle, or may perform data transmission based on another quantity of times of repeated transmission. This is not limited in this embodiment of this application.

In an optional embodiment, a second threshold Q may be pre-configured or predefined, where Q is an integer greater than 1. That the terminal device repeatedly transmits the first data on the N repeated transmission occasions in the K repeated transmission occasions includes: When a total quantity of transmission cycles is less than or equal to the second threshold Q, the terminal device repeatedly transmits the first data on the N repeated transmission occasions. Correspondingly, that the network device repeatedly transmits the first data on the N repeated transmission occasions in the K repeated transmission occasions includes: When a total quantity of transmission cycles is less than or equal to the second threshold Q, the network device repeatedly transmits the first data on the N repeated transmission occasions.

It should be understood that, a quantity of times of data transmission in one transmission cycle is N, and the total quantity of transmission cycles is a total quantity of transmission cycles since the first data is transmitted on the N repeated transmission occasions. That is, when the total quantity of transmission cycles is less than or equal to Q, the network device and the terminal device repeatedly transmit the first data on the N repeated transmission occasions. Once the total quantity of transmission cycles is greater than Q, the terminal device and the network device may resume transmission performed on the K repeated transmission occasions, or may perform data transmission based on another quantity of times of repeated transmission. This is not limited in this embodiment of this application.

In this embodiment of this application, a time period or a threshold is pre-configured or predefined, so that the quantity of times of repeated transmission of data can be more flexibly adjusted based on an actual situation. This improves data transmission efficiency.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the data transmission method according to the embodiments of this application with reference to FIG. 1 to FIG. 6. The following describes in detail an apparatus according to the embodiments of this application with reference to FIG. 7 to FIG. 10. The apparatus includes a corresponding module configured to execute the foregoing embodiments. The module may be software, hardware, or a combination of software and hardware.

Figure 7:
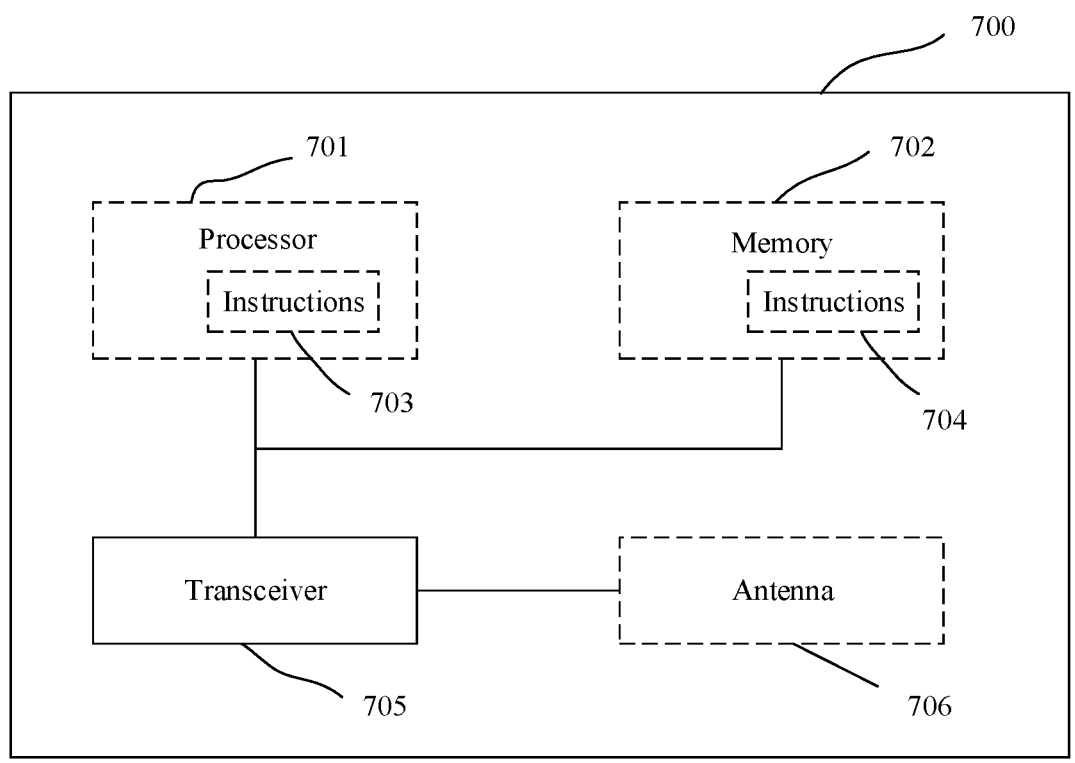
FIG. 7 is a schematic diagram of a structure of an apparatus according to an embodiment of this application.

FIG. 7 is a schematic diagram of a structure of an apparatus. The apparatus 700 may be a network device; or may be a terminal device; or may be a chip, a chip system, a processor, or the like that supports a network device in implementing the foregoing method; or may be a chip, a chip system, a processor, or the like that supports a terminal device in implementing the foregoing method. The apparatus may be configured to implement the method described in the foregoing method embodiments. For details, refer to the descriptions in the foregoing method embodiments.

The apparatus 700 may include one or more processors 701. The processor 701 may also be referred to as a processing unit, and can implement a specific control function. The processor 701 may be a general-purpose processor, a dedicated processor, or the like. For example, the processor 701 may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a software program, and process data of the software program.

In an optional design, the processor 701 may alternatively store instructions and/or data 703, and the instructions and/or data 703 may be run by the processor, so that the apparatus 700 performs the method described in the foregoing method embodiments.

In another optional design, the processor 701 may include a transceiver unit configured to implement receiving and sending functions. For example, the transceiver unit may be a transceiver circuit, an interface, or an interface circuit. A transceiver circuit, an interface, or an interface circuit configured to implement the sending function and a transceiver circuit, an interface, or an interface circuit configured to implement the receiving function may be separate, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, the apparatus 700 may include a circuit, and the circuit may implement the sending, receiving, or communication function in the foregoing method embodiments.

Optionally, the apparatus 700 may include one or more memories 702. The memory may store instructions 704, and the instructions may be run on the processor, so that the apparatus 700 performs the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 700 may further include a transceiver 705 and/or an antenna 707. The processor 701 may be referred to as a processing unit, and control the apparatus 700. The transceiver 705 may be referred to as a transceiver unit, a transceiver, a transceiver circuit, a transceiver, or the like, and is configured to implement receiving and sending functions.

In a possible design, an apparatus 700 (for example, an integrated circuit, a wireless device, a circuit module, or a terminal device) may include a transceiver 705, configured to: receive first information, where the first information is used to configure K repeated transmission occasions; and repeatedly transmit first data on N repeated transmission occasions in the K repeated transmission occasions, where the N repeated transmission occasions are discontinuous in time domain, K is an integer greater than 1, and N is an integer greater than or equal to 1 and less than K. Optionally, the apparatus 700 may further include a processor 701, and the processor 701 is configured to process the first information.

Optionally, the transceiver 705 is further configured to receive second information, where the second information is used to indicate repeated transmission performed on the N repeated transmission occasions.

Optionally, the second information is used to indicate a bitmap, the bitmap includes K bits, the K bits include N 0s or N 1s, and the N 0s or the N is are used to indicate the N repeated transmission occasions.

Optionally, the second information is used to indicate one or more parameters, and there is a correspondence between the one or more parameters and the N repeated transmission occasions.

Optionally, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel PDCCH monitoring cycle indication, or PDCCH monitoring skipping indication.

Optionally, the transceiver 705 is further configured to receive control information, where there is a correspondence between one or more of a radio network temporary identifier, a search space, or a control resource set corresponding to the control information and the N repeated transmission occasions.

Optionally, the transceiver 705 is further configured to receive a pilot, where there is a correspondence between a sequence of the pilot and the N repeated transmission occasions.

Optionally, the transceiver 705 is specifically configured to repeatedly transmit the first data on the N repeated transmission occasions in a first time period.

In another possible implementation, an apparatus 700 (for example, an integrated circuit, a wireless device, a circuit module, or a terminal device) may include a transceiver 705, configured to: send first information, where the first information is used to configure K repeated transmission occasions; and repeatedly transmit first data on N repeated transmission occasions in the K repeated transmission occasions, where the N repeated transmission occasions are discontinuous in time domain, K is an integer greater than 1, and N is an integer greater than or equal to 1 and less than K. Optionally, the apparatus 700 may further include a processor 701, and the processor 701 is configured to generate the first information.

Optionally, the transceiver 705 is further configured to send second information, where the second information is used to indicate repeated transmission performed on the N repeated transmission occasions.

Optionally, the second information is used to indicate a bitmap, the bitmap includes K bits, the K bits include N 0s or N 1s, and the N 0s or the N 1s are used to indicate the N repeated transmission occasions.

Optionally, the second information is used to indicate one or more parameters, and there is a correspondence between the one or more parameters and the N repeated transmission occasions.

Optionally, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel PDCCH monitoring cycle indication, or PDCCH monitoring skipping indication.

Optionally, the transceiver 705 is further configured to send control information, where there is a correspondence between one or more of a radio network temporary identifier, a search space, or a control resource set corresponding to the control information and the N repeated transmission occasions.

Optionally, the transceiver 705 is further configured to send a pilot, where there is a correspondence between a sequence of the pilot and the N repeated transmission occasions.

Optionally, the transceiver 705 is specifically configured to repeatedly transmit, by the network device, the first data on the N repeated transmission occasions in a first time period.

According to the apparatus in this embodiment of this application, the terminal device and the network device repeatedly transmit the first data on the N repeated transmission occasions that are discontinuous in time domain, so that a quantity of times of repeated transmission of the first data is reduced from pre-configured K to N. In addition to ensuring reliable transmission of the first data, this can reduce the quantity of times of repeated transmission of the first data, reduce power consumption of the terminal device, and save transmission resources. In addition, because the N repeated transmission occasions are discontinuous in time domain, a total time span of repeated transmission of the first data is large. This can maintain a high time diversity gain, thereby improving system performance.

It may be understood that the apparatus 700 according to this embodiment of this application may be configured to implement corresponding steps of the method performed by the terminal device or the network device in the foregoing method embodiments, for example, the method in FIG. 2. Therefore, the beneficial effects in the foregoing method embodiments can also be achieved. For brevity, details are not described herein.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 7. The apparatus may be an independent device, or may be a part of a larger device. For example, the apparatus may be:

(1) an independent integrated circuit IC, a chip, a chip system, or subsystem;
(2) a set of one or more ICs, where optionally, the IC set may also include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(7) others, or the like.

Figure 8:
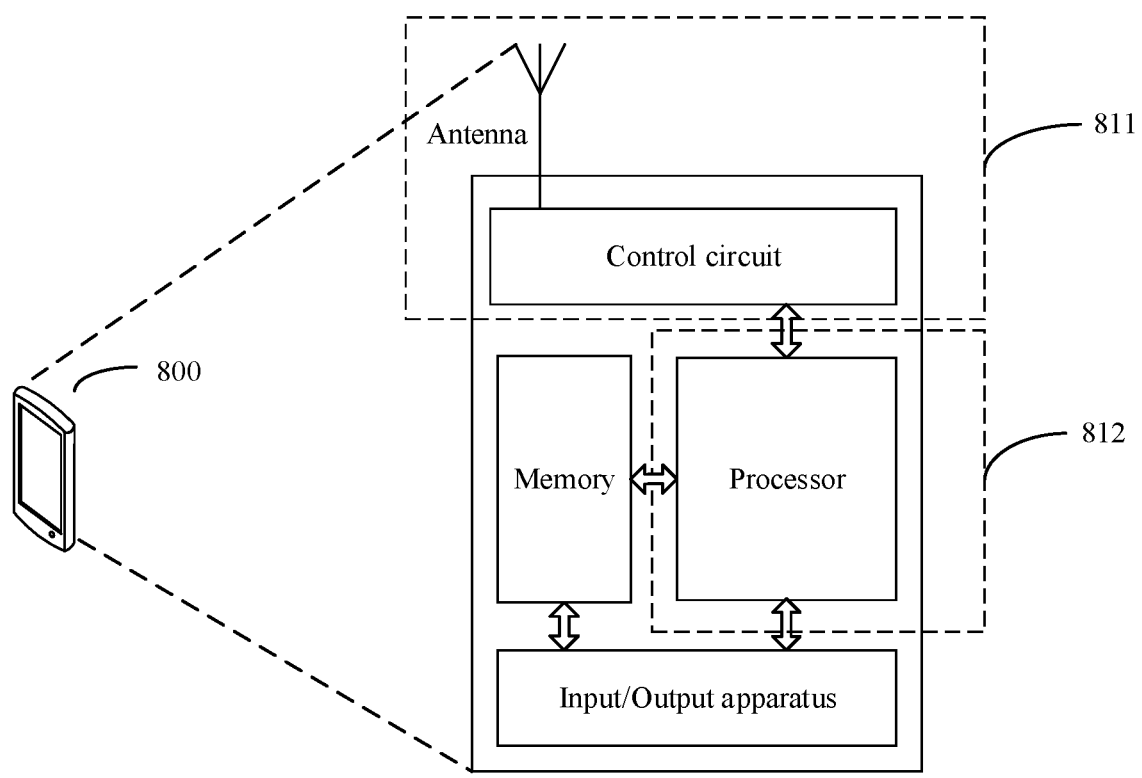
FIG. 8 is a schematic diagram of a structure of a terminal device according to an embodiment of this application.

FIG. 8 is a schematic diagram of a structure of a terminal device. The terminal device is applicable to the scenario shown in FIG. 1. For ease of description, FIG. 8 shows only main components of the terminal device. As shown in FIG. 8, the terminal device 800 includes a processor, a memory, a control circuit, an antenna, and an input/output apparatus. The processor is mainly configured to: process a communication protocol and communication data, control an entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user and output data to the user.

After the terminal device is powered on, the processor may read the software program in a storage unit, parse and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal in a form of an electromagnetic wave by using the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 8 shows only one memory and one processor. In an actual terminal device, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 8 integrates functions of the baseband processor and the central processing unit. A person skilled in the art may understand that the baseband processor and the central processing unit may also be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have receiving and sending functions may be considered as a transceiver unit 811 of the terminal device 800, and the processor having a processing function may be considered as a processing unit 812 of the terminal device 800. As shown in FIG. 8, the terminal device 800 includes the transceiver unit 811 and the processing unit 812. The transceiver unit may also be referred to as a transceiver, a transceiver, a transceiver apparatus, or the like. Optionally, a component that is in the transceiver unit 811 and that is configured to implement a receiving function may be considered as a receiving unit, and a component that is in the transceiver unit 811 and that is configured to implement a sending function may be considered as a sending unit. In other words, the transceiver unit 811 includes the receiving unit and the sending unit. For example, the receiving unit may also be referred to as a receiver, a receiver, or a receiver circuit, and the sending unit may be referred to as a transmitter, a transmitter, or a transmitter circuit. Optionally, the receiving unit and the sending unit may be one integrated unit, or may be a plurality of independent units. The receiving unit and the sending unit may be in one geographical location, or may be distributed in a plurality of geographical locations.

Figure 9:
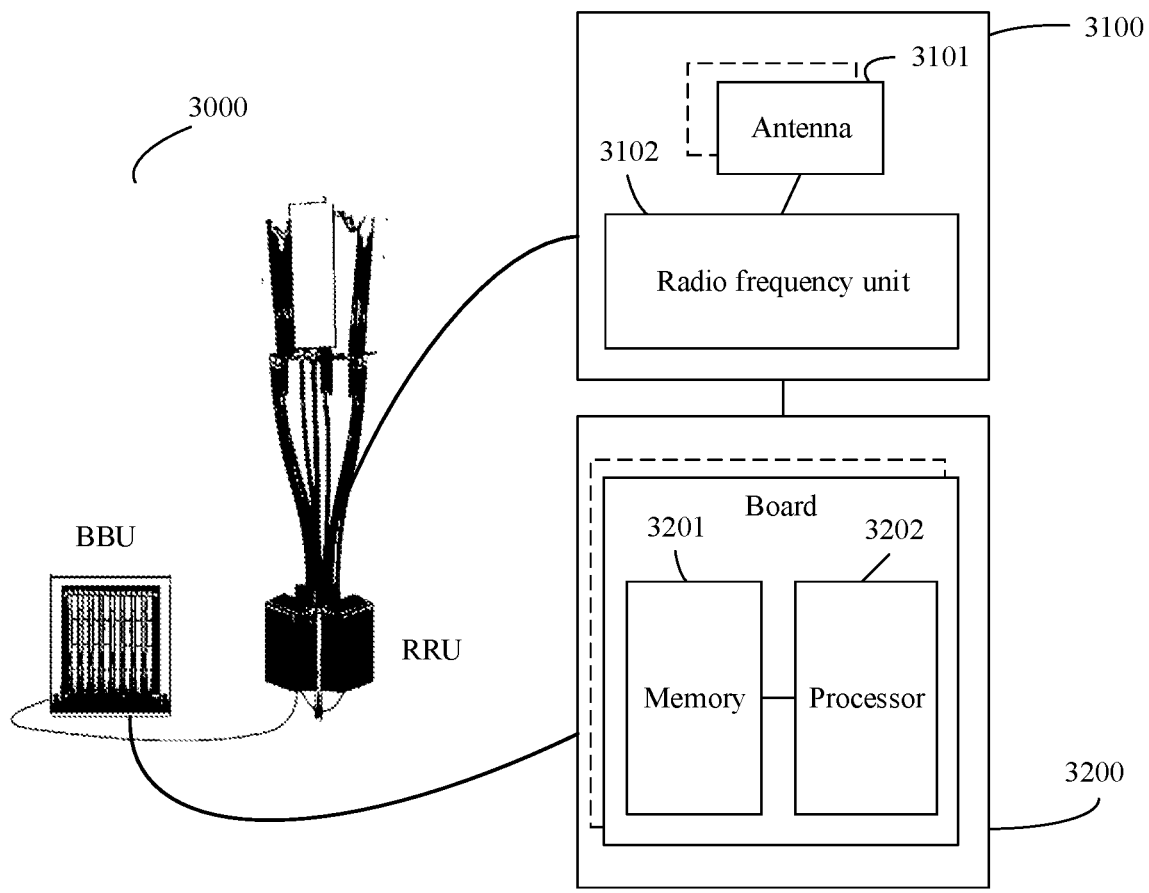
FIG. 9 is a schematic diagram of a structure of a network device according to an embodiment of this application.

FIG. 9 is a schematic diagram of a structure of a network device according to an embodiment of this application, for example, may be a schematic diagram of a structure of a base station. The network device 3000 may be used in the communication system shown in FIG. 1, to perform functions of the network device in the foregoing method embodiments, or implement steps or procedures performed by the network device in the foregoing method embodiments.

As shown in the figure, the network device 3000 may include one or more radio frequency units, for example, a remote radio unit (remote radio unit, RRU) 3100 and one or more baseband units (baseband units, BBUs) 3200. The BBU 3200 may also be referred to as a digital unit (digital unit, DU). The RRU 3100 may be referred to as a transceiver unit, and corresponds to the transceiver unit 510 in FIG. 5. Optionally, the RRU 3100 may also be referred to as a transceiver, a transceiver circuit, a transceiver, or the like, and may include at least one antenna 3101 and a radio frequency unit 3102. Optionally, the RRU 3100 may include a receiving unit and a sending unit. The receiving unit may correspond to a receiver (or referred to as a receiver or a receiving circuit), and the sending unit may correspond to a transmitter (or referred to as a transmitter or a transmitting circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to: perform baseband processing, control the network device, and the like. The RRU 3100 and the BBU 3200 may be physically disposed together, or may be physically separate, for example, may be in a distributed base station.

The BBU 3200 is a control center of the network device, or may be referred to as a processing unit, and is mainly configured to complete baseband processing functions such as channel coding, multiplexing, modulation, and spectrum spreading. For example, the BBU 3200 may be configured to control the network device to perform an operation procedure related to the network device in the foregoing method embodiments.

In an example, the BBU 3200 may include one or more boards, and a plurality of boards may jointly support a radio access network (such as an LTE network) having a single access standard, or may separately support radio access networks (such as an LTE network, a 8G network, or another network) having different access standards. The BBU 3200 further includes a memory 3201 and a processor 3202. The memory 3201 is configured to store necessary instructions and data. The processor 3202 is configured to control the base station to perform a necessary action, for example, configured to control the base station to perform an operation procedure related to the network device in the foregoing method embodiments. The memory 3201 and the processor 3202 may serve one or more boards. In other words, a memory and a processor may be separately disposed on each board. Alternatively, a plurality of boards may share a same memory and a same processor. In addition, a necessary circuit may be further disposed on each board.

It should be understood that, the network device 3000 shown in FIG. 9 can implement each process of the network device in the method embodiments. Operations and/or functions of modules in the network device 3000 are respectively intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

Figure 10:
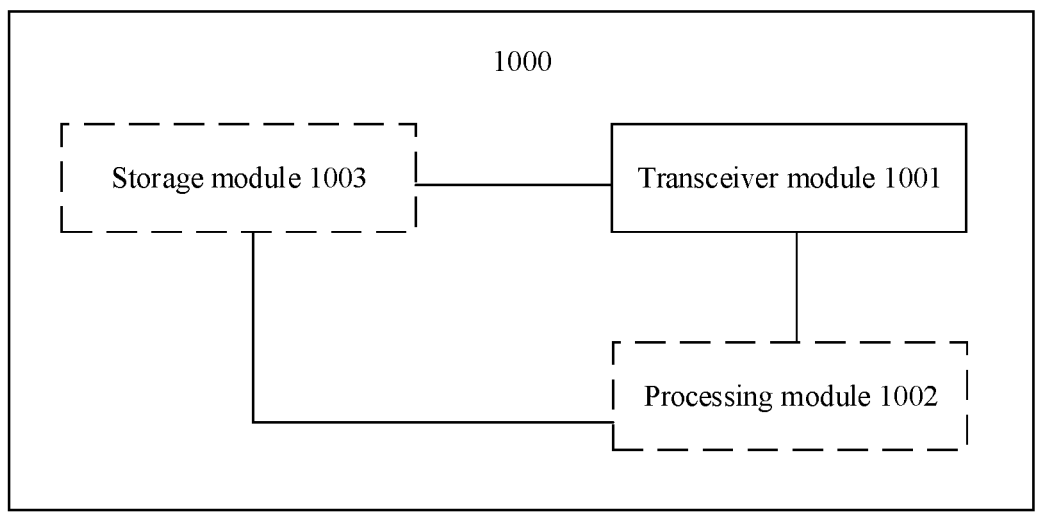
FIG. 10 is a schematic block diagram of another apparatus according to an embodiment of this application.

FIG. 10 is a schematic block diagram of another apparatus 1000 according to an embodiment of this application. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the method in the method embodiments of this application. The apparatus 1000 may include a transceiver module 1001 (a transceiver unit) and a processing module 1002 (a processing unit). Optionally, the apparatus 1000 further includes a storage module 1003 (a storage unit).

In a possible design, one or more modules in FIG. 10 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be disposed separately, or may be integrated.

The apparatus has a function of implementing the terminal device described in the embodiments of this application. For example, the apparatus includes a corresponding module, unit, or means (means) used for the terminal device to perform the steps related to the terminal device that are described in the embodiments of this application. The function, the unit, or the means (means) may be implemented by software or hardware, or may be implemented by hardware executing corresponding software, or may be implemented by a combination of software and hardware. For details, refer to the corresponding descriptions in the foregoing corresponding method embodiments.

Alternatively, the apparatus has a function of implementing the network device described in the embodiments of this application. For example, the apparatus includes a corresponding module, unit, or means (means) used for the network device to perform the steps related to the network device that are described in the embodiments of this application. The function, the unit, or the means (means) may be implemented by software or hardware, or may be implemented by hardware executing corresponding software, or may be implemented by a combination of software and hardware. For details, refer to the corresponding descriptions in the foregoing corresponding method embodiments.

Optionally, the modules in the apparatus 1000 in this embodiment of this application may be configured to perform the method described in the embodiments of this application shown in FIG. 2.

In a possible implementation, an apparatus 1000 may include a transceiver module 1001, configured to: receive first information, where the first information is used to configure K repeated transmission occasions; and repeatedly transmit first data on N repeated transmission occasions in the K repeated transmission occasions, where the N repeated transmission occasions are discontinuous in time domain, K is an integer greater than 1, and N is an integer greater than or equal to 1 and less than K. Optionally, the apparatus 1000 may further include a processing module 1002, and the processing module 1002 is configured to process the first information.

Optionally, the transceiver module 1001 is further configured to receive second information, where the second information is used to indicate repeated transmission performed on the N repeated transmission occasions.

Optionally, the second information is used to indicate a bitmap, the bitmap includes K bits, the K bits include N 0s or N 1s, and the N 0s or the N 1s are used to indicate the N repeated transmission occasions.

Optionally, the second information is used to indicate one or more parameters, and there is a correspondence between the one or more parameters and the N repeated transmission occasions.

Optionally, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel PDCCH monitoring cycle indication, or PDCCH monitoring skipping indication.

Optionally, the transceiver module 1001 is further configured to receive control information, where there is a correspondence between one or more of a radio network temporary identifier, a search space, or a control resource set corresponding to the control information and the N repeated transmission occasions.

Optionally, the transceiver module 1001 is further configured to receive a pilot, where there is a correspondence between a sequence of the pilot and the N repeated transmission occasions.

Optionally, the transceiver module 1001 is specifically configured to repeatedly transmit the first data on the N repeated transmission occasions in a first time period.

It may be understood that the apparatus 1000 may correspond to the method performed by the terminal device in the foregoing method embodiments, for example, the method in FIG. 2. In addition, the foregoing and other management operations and/or functions of the modules in the apparatus 1000 are separately used to implement corresponding steps of the method performed by the terminal device in the foregoing method embodiments. Therefore, the beneficial effects in the foregoing method embodiments can also be achieved. For brevity, details are not described herein.

In another possible implementation, an apparatus 1000 includes a transceiver module 1001, configured to: send first information, where the first information is used to configure K repeated transmission occasions; and repeatedly transmit first data on N repeated transmission occasions in the K repeated transmission occasions, where the N repeated transmission occasions are discontinuous in time domain, K is an integer greater than 1, and N is an integer greater than or equal to 1 and less than K. Optionally, the apparatus 1000 may further include a processing module 1002, and the processing module 1002 is configured to generate the first information.

Optionally, the transceiver module 1001 is further configured to send second information, where the second information is used to indicate repeated transmission performed on the N repeated transmission occasions.

Optionally, the second information is used to indicate a bitmap, the bitmap includes K bits, the K bits include N 0s or N 1s, and the N 0s or the N 1s are used to indicate the N repeated transmission occasions.

Optionally, the second information is used to indicate one or more parameters, and there is a correspondence between the one or more parameters and the N repeated transmission occasions.

Optionally, the second information is carried on a power saving channel or in a power saving signal, and the power saving channel or the power saving signal is used for one or more of wake-up triggering, sleep triggering, cross-carrier scheduling triggering, channel state information CSI reporting triggering, physical downlink control channel PDCCH monitoring cycle indication, or PDCCH monitoring skipping indication.

Optionally, the transceiver module 1001 is further configured to send control information, where there is a correspondence between one or more of a radio network temporary identifier, a search space, or a control resource set corresponding to the control information and the N repeated transmission occasions.

Optionally, the transceiver module 1001 is further configured to send a pilot, where there is a correspondence between a sequence of the pilot and the N repeated transmission occasions.

Optionally, the transceiver module 1001 is specifically configured to repeatedly transmit, by the network device, the first data on the N repeated transmission occasions in a first time period.

It may be understood that the apparatus 1000 may correspond to the method performed by the network device in the foregoing method embodiments, for example, the method in FIG. 2. In addition, the foregoing and other management operations and/or functions of the modules in the apparatus 1000 are separately used to implement corresponding steps of the method performed by the network device in the foregoing method embodiments. Therefore, the beneficial effects in the foregoing method embodiments can also be achieved. For brevity, details are not described herein.

According to the apparatus in this embodiment of this application, the terminal device and the network device repeatedly transmit the first data on the N repeated transmission occasions that are discontinuous in time domain, so that a quantity of times of repeated transmission of the first data is reduced from pre-configured K to N. In addition to ensuring reliable transmission of the first data, this can reduce the quantity of times of repeated transmission of the first data, reduce power consumption of the terminal device, and save transmission resources. In addition, because the N repeated transmission occasions are discontinuous in time domain, a total time span of repeated transmission of the first data is large. This can maintain a high time diversity gain, thereby improving system performance.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

It should be understood that the processor in the embodiments of this application may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in the embodiments of this application, the memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through examples but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that "an embodiment" mentioned in the entire specification means that particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that various reference numerals such as "first" and "second" in this application are merely used for differentiation for ease of description, and are not used to limit a scope of the embodiments of this application, or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It should be understood that, in the embodiments of this application, "B corresponding to A" indicates that B is associated with A, and B may be determined according to A. However, it should further be understood that determining B according to A does not mean that B is determined according to A only, and B may alternatively be determined according to A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "store", "pre-store", "pre-negotiate", "pre-configure", "solidify", or "pre-burn".

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the method described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

For same or similar parts in the embodiments of this application, refer to each other. In the embodiments of this application and the implementations/implementation methods in the embodiments, unless otherwise specified or a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by a terminal device, first information, wherein the first information is used to configure K repeated transmission occasions; and
repeatedly transmitting, by the terminal device, first data on N repeated transmission occasions in the K repeated transmission occasions, wherein the N repeated transmission occasions discontinue at every interval of at least one repeated transmission occasion in the K repeated transmission occasions and resume without an acknowledgement or a negative acknowledgement feedback from a network device in a time domain, K is an integer greater than 1, and N is an integer greater than or equal to 1 and less than K.

2. The method according to claim 1, further comprising:
receiving, by the terminal device, second information, wherein the second information is used to indicate repeated transmission performed on the N repeated transmission occasions.

3. The method according to claim 2, wherein the second information is used to indicate a bitmap, the bitmap comprises K bits, the K bits comprise N 0s or N 1s, and the N 0s or the N is are used to indicate the N repeated transmission occasions.

4. The method according to claim 2, wherein the second information is used to indicate one or more parameters, and there is a correspondence between the one or more parameters and the N repeated transmission occasions.

5. The method according to claim 2, wherein the second information is carried on a power saving channel or in a power saving signal, and the power saving channel or the power saving signal is used for at least one of wake-up triggering, sleep triggering, cross-carrier scheduling triggering, channel state information (CSI) reporting triggering, physical downlink control channel (PDCCH) monitoring cycle indication, or PDCCH monitoring skipping indication.

6. The method according to claim 1, further comprising:
receiving, by the terminal device, control information, wherein there is a correspondence between at least one of a radio network temporary identifier, a search space, or a control resource set corresponding to the control information and the N repeated transmission occasions.

7. The method according to claim 6, further comprising:
receiving, by the terminal device, a pilot, wherein there is a correspondence between a sequence of the pilot and the N repeated transmission occasions.

8. The method according to claim 1, wherein the repeatedly transmitting, by the terminal device, the first data on the N repeated transmission occasions in the K repeated transmission occasions comprises:
repeatedly transmitting, by the terminal device, the first data on the N repeated transmission occasions in a first time period.

9. A data transmission method, comprising:
sending, by a network device, first information, wherein the first information is used to configure K repeated transmission occasions; and
repeatedly transmitting, by the network device, first data on N repeated transmission occasions in the K repeated transmission occasions, wherein the N repeated transmission occasions discontinue at every interval of at least one repeated transmission occasion in the K repeated transmission occasions and resume without an acknowledgement or a negative acknowledgement feedback from a terminal device in a time domain, K is an integer greater than 1, and N is an integer greater than or equal to 1 and less than K.

10. The method according to claim 9, further comprising:
sending, by the network device, second information, wherein the second information is used to indicate repeated transmission performed on the N repeated transmission occasions.

11. The method according to claim 10, wherein the second information is used to indicate a bitmap, the bitmap comprises K bits, the K bits comprise N 0s or N 1s, and the N 0s or the N 1s are used to indicate the N repeated transmission occasions.

12. The method according to claim 10, wherein the second information is used to indicate one or more parameters, and there is a correspondence between the one or more parameters and the N repeated transmission occasions.

13. The method according claim 10, wherein the second information is carried on a power saving channel or in a power saving signal, and the power saving channel or the power saving signal is used for at least one of wake-up triggering, sleep triggering, cross-carrier scheduling triggering, channel state information (CSI) reporting triggering, physical downlink control channel (PDCCH) monitoring cycle indication, or PDCCH monitoring skipping indication.

14. The method according to claim 9, further comprising:
sending, by the network device, control information, wherein there is a correspondence between at least one of a radio network temporary identifier, a search space, or a control resource set corresponding to the control information and the N repeated transmission occasions.

15. The method according to claim 14, further comprising:
sending, by the network device, a pilot, wherein there is a correspondence between a sequence of the pilot and the N repeated transmission occasions.

16. The method according to claim 9, wherein the repeatedly transmitting, by the network device, the first data on the N repeated transmission occasions in the K repeated transmission occasions comprises:
repeatedly transmitting, by the network device, the first data on the N repeated transmission occasions in a first time period.

17. A terminal device comprising:
a processor; and
a non-transitory memory configured to store instructions that when executed by the processor, cause the terminal device to perform steps comprising:
receiving first information, wherein the first information is used to configure K repeated transmission occasions; and
repeatedly transmitting first data on N repeated transmission occasions in the K repeated transmission occasions, wherein the N repeated transmission occasions discontinue at every interval of at least one repeated transmission occasion in the K repeated transmission occasions and resume without an acknowledgement or a negative acknowledgement feedback from a network device in a time domain, K is an integer greater than 1, and N is an integer greater than or equal to 1 and less than K.

18. The terminal device according to claim 17, wherein the steps further comprise:
receiving second information, wherein the second information is used to indicate repeated transmission performed on the N repeated transmission occasions.

19. The terminal device according to claim 18, wherein the second information is used to indicate a bitmap, the bitmap comprises K bits, the K bits comprise N 0s or N 1s, and the N 0s or the N 1s are used to indicate the N repeated transmission occasions.

20. The terminal device according to claim 18, wherein the second information is used to indicate one or more parameters, and there is a correspondence between the one or more parameters and the N repeated transmission occasions.

* * * * *

UNITED STATES PATENT AND TRADEMARK OFFICE
CERTIFICATE OF CORRECTION

PATENT NO. : 11,910,321 B2
APPLICATION NO. : 17/675752
DATED : February 20, 2024
INVENTOR(S) : Zhang et al.

It is certified that error appears in the above-identified patent and that said Letters Patent is hereby corrected as shown below:

In the Claims

Claim 3: Column 33, Line 37: "0s or the N is are used to indicate the N repeated transmis-" should read -- 0s or the N 1s are used to indicate the N repeated transmis- --.

Signed and Sealed this
Twenty-eighth Day of May, 2024

Katherine Kelly Vidal
Director of the United States Patent and Trademark Office